United States Patent [19]
Sakane et al.

[11] Patent Number: 5,461,565
[45] Date of Patent: Oct. 24, 1995

[54] ANTI-SKID APPARATUS FOR AUTOMOTIVE VEHICLE

[75] Inventors: Shinsuke Sakane, Chiryu; Hiroyuki Ichikawa, Okazaki; Nobuyasu Nakanishi, Susono; Tatsuo Sugitani, Mishima, all of Japan

[73] Assignee: Aisin Seiki Kabushiki Kaisha, Kariya, Japan

[21] Appl. No.: 929,408

[22] Filed: Aug. 14, 1992

[30] Foreign Application Priority Data

Aug. 14, 1991 [JP] Japan .................... 3-228865

[51] Int. Cl.⁶ .................... B60T 8/60
[52] U.S. Cl. .................... 364/426.02
[58] Field of Search .......... 364/426.02, 426.01, 364/426.03; 180/197; 303/100, 97, 103, 106

[56] References Cited

U.S. PATENT DOCUMENTS

| | | | |
|---|---|---|---|
| 4,717,173 | 1/1988 | Sugasawa et al. | 280/707 |
| 4,730,879 | 3/1988 | Adachi | 303/116 |
| 4,800,289 | 1/1989 | Adachi | 303/119 |
| 5,007,007 | 4/1991 | van Zanten et al. | 364/574 |
| 5,125,723 | 6/1992 | Sakuma et al. | 303/100 |
| 5,156,447 | 10/1992 | Hummel et al. | 303/113 TR |
| 5,186,042 | 2/1993 | Miyazaki | 73/118.1 |
| 5,229,955 | 7/1993 | Nishiwaki et al. | 364/550 |
| 5,249,850 | 10/1993 | Kampfmann et al. | 303/103 |
| 5,335,178 | 8/1994 | Schäfer et al. | 364/426.02 |

FOREIGN PATENT DOCUMENTS 5858254 2/1976 Japan .

*Primary Examiner*—Kevin J. Teska
*Assistant Examiner*—Stephen J. Walder, Jr.
*Attorney, Agent, or Firm*—Sughrue, Mion, Zinn, Macpeak & Seas

[57] ABSTRACT

An anti-skid apparatus for installation in a vehicle braking system includes an electrically operated actuator arranged to control hydraulic brake pressure applied to each wheel brake cylinder of road wheels of the vehicle and an electronic control device for applying an electric control signal to the actuator in response to electric signals indicative of each rotational speed of the road wheels so that the actuator is operated to decrease or increase the brake pressure when the rotational speed of the road wheels in braking operation becomes lower than a reference speed the value of which is defined on a basis of a travel, speed of the vehicle. The electronic control device is designed to detect a step on a travel road of the vehicle in braking operation and to compare the rotational speed of the road wheels with a subtracted value of the reference speed when the step on the travel road has been detected within a predetermined time thereby to maintain the actuator in its deactivated condition when the rotational speed of the road wheels is larger than the subtracted value of the reference speed.

2 Claims, 7 Drawing Sheets

ANTI-SKID APPARATUS FOR AUTOMOTIVE VEHICLE

BACKGROUND OF THE INVENTION

1. Field of the Invention

The present invention relates to an anti-skid apparatus for installation in a vehicle braking system to prevent the road wheels of the vehicle from locking in braking operation.

2. Description of the Prior Art

In this kind of technical field, there has been proposed an anti-skid apparatus of the type which includes speed detecting means arranged to detect each rotational speed of road wheels of the vehicle for producing electric signals respectively indicative of the detected wheel speed, an electrically operated actuator arranged to control hydraulic brake pressure applied to each wheel brake cylinder of the road wheels, and an electronic control device for applying an electric control signal to the actuator in response to the electric signals from the speed detecting means so that the actuator is operated to control the brake pressure in accordance with road surface conditions. The operation of the actuator is conducted under control of the electronic control device when the wheel speed in braking operation becomes lower than a reference speed the value of which is defined by a multiplied value of the wheel speed with a predetermined slip ratio and also the negative acceleration of the road wheels becomes smaller than a predetermined value. Disclosed in Japanese Patent Publication No. 58-58254 is an anti-skid apparatus designed to prevent erroneous operation of the actuator during travel of the vehicle on a rough road such as a gravel road, a rugged road or the like.

During travel of the vehicle equipped with the conventional anti-skid apparatus, the rotational speed of the respective road wheels does not decrease lower than the reference speed even when the vehicle is braked by light depression of the brake pedal on a flat road. If in such braking operation there are steps on the travel road, the road wheels of the vehicle are floated in a moment from the travel road to cause sudden decrease of the torque acting on the wheel tires. In this instance, the rotational speed of the respective road wheels becomes lower than the reference speed, and the negative acceleration of the road wheels becomes smaller than the predetermined value. As a result, the actuator is operated to decrease the brake pressure applied to the wheel brake cylinders. Accordingly, the road wheels of the vehicle may not be applied with sufficient braking force even when grounded after passing over the steps on the travel road, and the driver is applied with unpleasant feel since the actuator is operated by light depression of the brake pedal.

SUMMARY OF THE INVENTION

It is, therefore, a primary object of the present invention to provide an anti-skid apparatus capable of maintaining the actuator in its deactivated condition when the road wheels of the vehicle have passed over steps on the travel road in braking operation.

According to the present invention, the object is accomplished by providing an anti-skid apparatus for installation in a braking system of an automotive vehicle which comprises speed detecting means arranged to detect each rotational speed of road wheels of the vehicle for producing electric signals respectively indicative of the detected wheel speed, an electrically operated actuator arranged to control hydraulic brake pressure applied to each wheel brake cylinder of the road wheels, and an electronic control device for applying an electric control signal to the actuator in response to the electric signals from the speed detecting means so that the actuator is operated to decrease or increase the brake pressure when the rotational speed of the road wheels in braking operation becomes lower than a reference speed the value of which is defined on a basis of a travel speed of the vehicle, wherein the electronic control device comprises means for detecting a step on a travel road of the vehicle in braking operation and means for comparing the rotational speed of the road wheels with a difference between the reference speed and a predetermined value when the step on the travel road has been detected within a predetermined time and for maintaining the actuator in its deactivated condition when the rotational speed of the road wheels is larger than the difference between the reference speed and the predetermined value.

BRIEF DESCRIPTION OF THE DRAWINGS

Additional objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
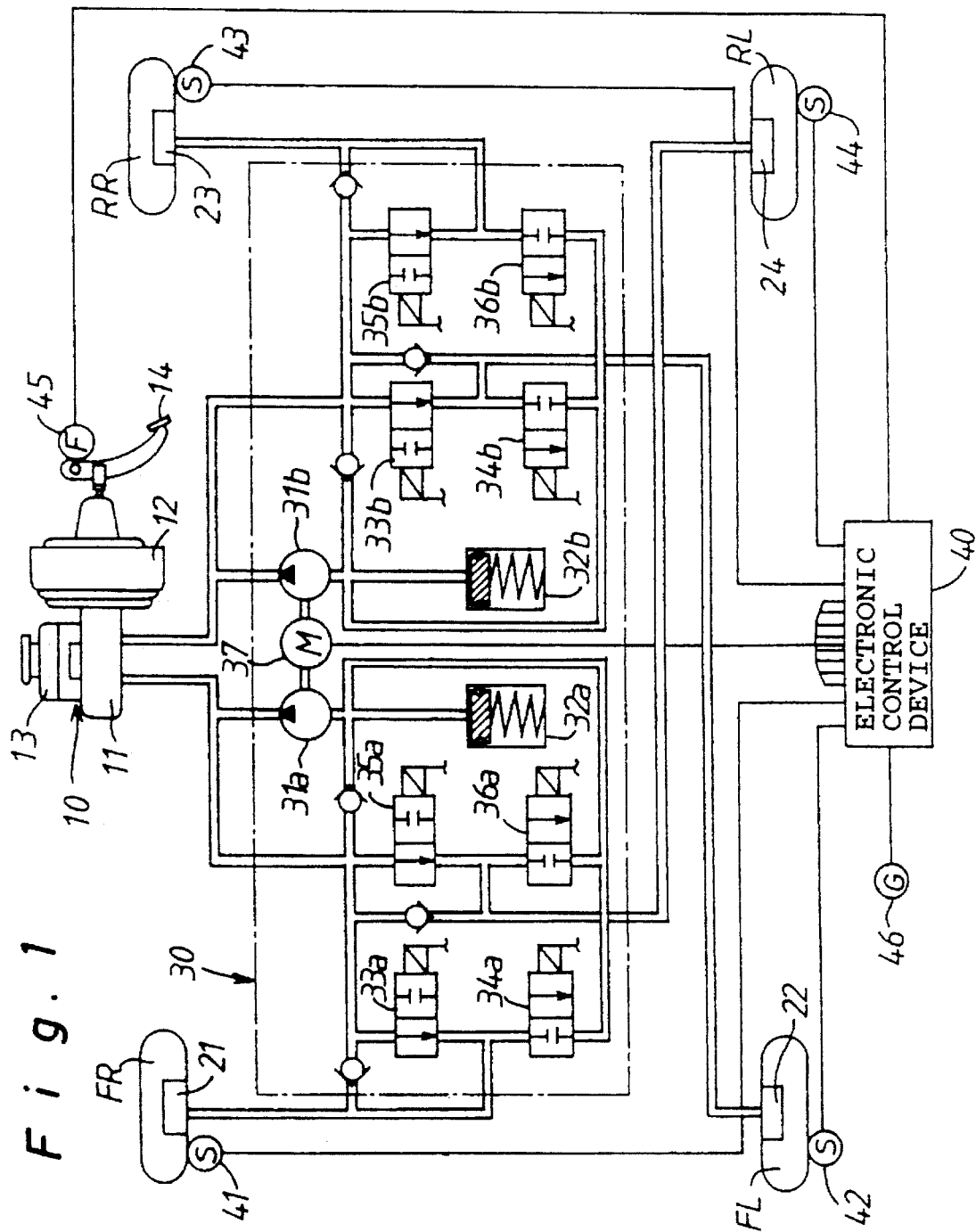
FIG. 1 is a schematic illustration of an anti-skid apparatus for installation in a vehicle braking system.

In FIG. 1 of the drawings, there is schematically illustrated an anti-skid apparatus for installation in a vehicle braking system which includes a source of hydraulic brake pressure 10 in the form of a master cylinder 11 equipped with a fluid reservoir 13 and with a brake booster 12 to be activated by depression of a brake pedal 14. The vehicle braking system further includes diagonal braking circuits connecting the master cylinder 11 to respective wheel brake cylinders 21, 22, 23 and 24 of front and rear road wheels FR, FL and RR, RL. Disposed within the diagonal braking circuits is a conventional electrically operated actuator 30 which comprises a pair of fluid pps 31a, 31b arranged to be driven by a single electric motor 37, a pair of fluid reservoirs 32a, 32b respectively in connection to the fluid pumps, and electrically operated switchover valves 33a–36a, 33b–36b. The electric motor 37 and switchover valves 33a–36a, 33b–36b are arranged to be activated or deactivated for control of an electronic control device 40.

Figure 2:
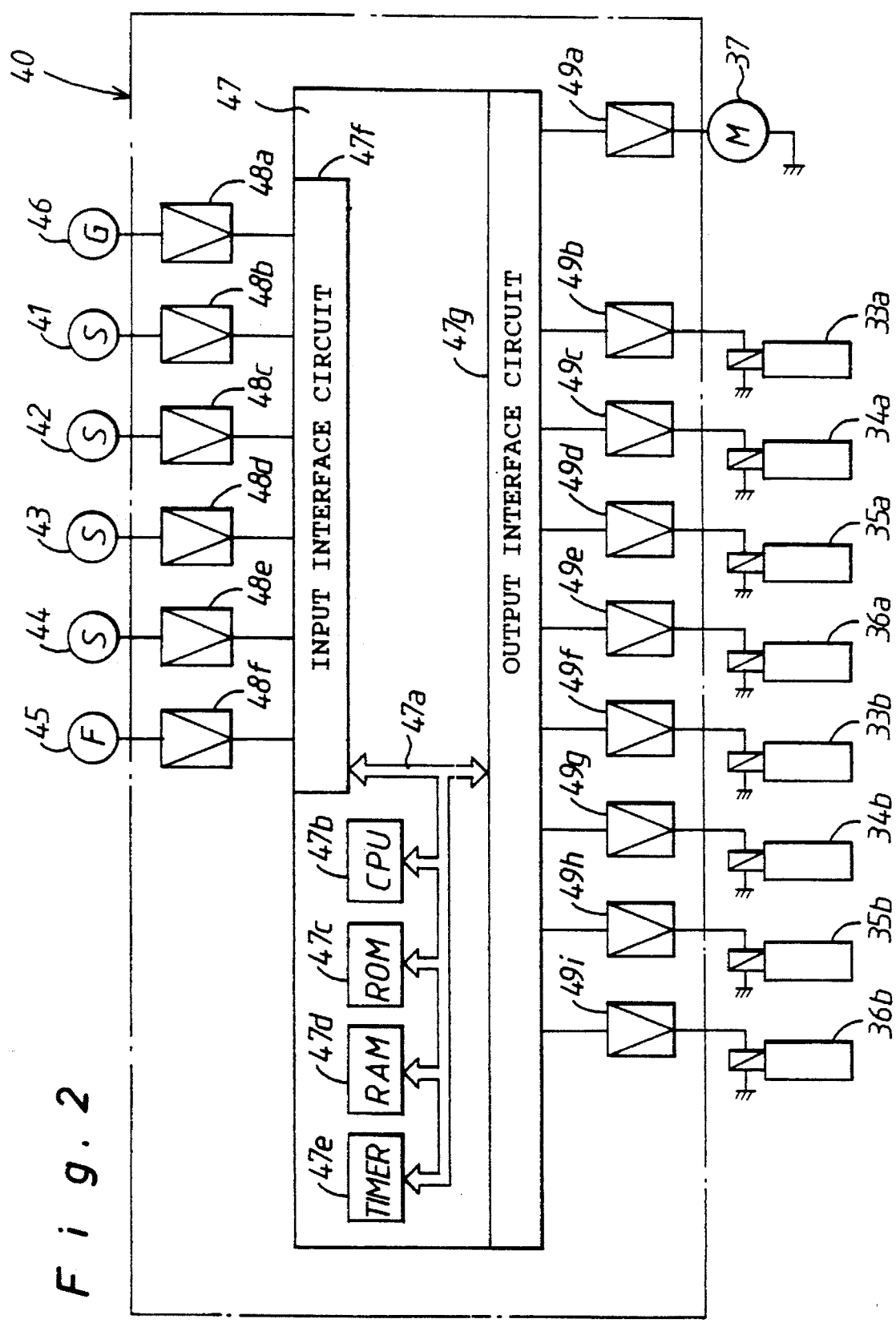
FIG. 2 is a block diagram of an electronic control device shown in FIG. 1.
Figure 3:
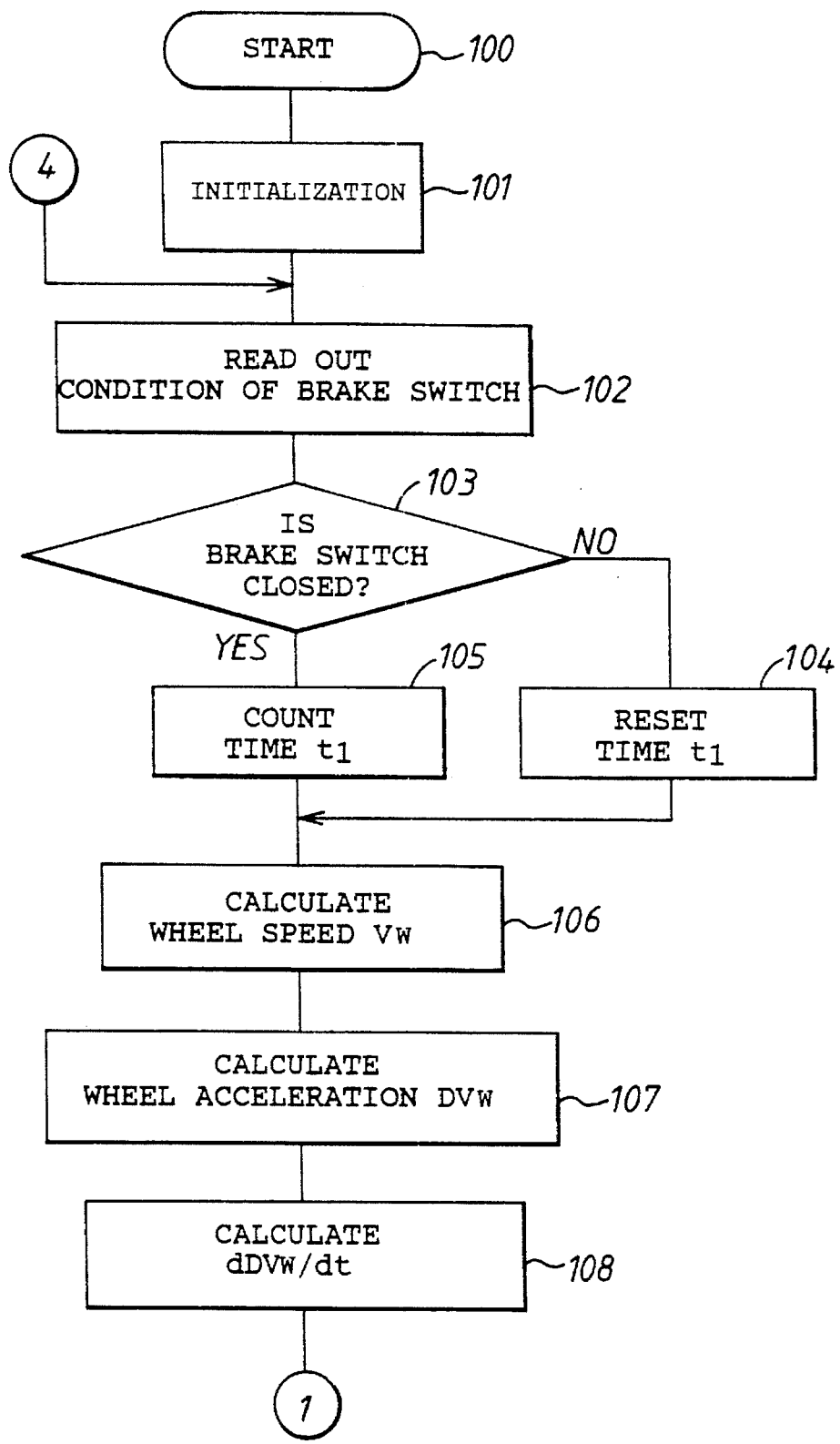
FIGS. 3 to 5 illustrate a flow chart of a control program executed by a microcomputer shown in FIG. 2.

The electronic control device 40 is connected at its input side to wheel speed sensors 41, 42, 43, 44 arranged to detect each rotational speed of road wheels FR, FL, RR, RL, a brake switch 45 of the normally open type arranged to be closed in response to depression of the brake pedal 14 and a deceleration sensor 46 arranged to detect a deceleration of the vehicle. The electronic control device 40 is connected at its output side to the electric motor 37 and switchover valves 33a–36a, 33b–36b to control the electrically operated actuator 30 in accordance with road surface conditions. As shown in FIG. 2, the electronic control device 40 is in the form of a microcomputer 47 which comprises a central processing unit or CPU 47b, a read-only memory or ROM 47c, a random-access memory or RAM 47d and a timer 47e connected in common to one another by means of a bus 47a. The microcomputer 47 has an input interface circuit 47f connected to the wheel speed sensors 41–44, brake switch 45 and deceleration sensor 46 respectively through amplifiers 48a–48f and an output interface circuit 47g connected to the electric motor 37 and switchover valves 33a–36a, 33b–36b respectively through driving circuits 49a–49i. The ROM 47c of computer 47 is arranged to memorize a control program shown by a flow chart in FIGS. 3 to 5, and the CPU 47b is arranged to execute the control program in response to closing of an ignition switch (not shown) of the vehicle. The RAM 47d is also arranged to temporarily memorize variables necessary for execution of the control program.

In the anti-skid apparatus described above, the electrically operated actuator 30 is operated under control of the microcomputer 47 in such a manner as described hereinafter. Assuming that the ignition switch has been closed to start the vehicle, the CPU of computer 47 initiates execution of the control program at step 100 shown in FIG. 3. At the following step 101, the CPU of computer 47 initializes the control program to reset an ABS flag indicative of an anti-skid control, a STEP flag indicative of presence of a step on the travel road, a lapse of time $t_1$ to be counted immediately after braking operation of the vehicle and a STEP time td to be counted immediately after setting the STEP flag and to reset previously calculated values. Subsequently, the CPU of computer 47 reads out a condition of the brake switch 45 at step 102 and determines at step 103 whether the brake switch 45 is closed or not. Assuming that the vehicle is travelling without depression of the brake pedal, the CPU of computer 47 determines a "No" answer at step 103 and causes the program to proceed to step 106 through step 104.

At step 106, the CPU of computer 47 calculates each rotational speed Vw of the road wheels in response to electric signals from the wheel speed sensors 41–44 and causes the program to proceed to step 107. Thus, the CPU of computer 47 calculates at step 107 each acceleration DVw of the road wheels based on the calculated wheel speed Vw and calculates at step 108 a reduction ratio dDVw/dt of the wheel acceleration based on the calculated wheel acceleration DVw. Subsequently, the CPU of computer 47 determines a "No" answer respectively at step 109 and 110 and causes the program to proceed to step 111. At step 111, the CPU of computer 47 determines whether the reduction ratio dDVw/dt of the wheel acceleration is smaller than a predetermined value A. Since in this instance the vehicle is travelling without depression of the brake pedal, the CPU of computer 47 determines a "No" answer at step 111 and causes the program to proceed to step 117 through step 116. At step 117, the CPU of computer 47 determines whether the calculated wheel speed Vw is smaller than a reference speed Vsh. Since the reference speed Vsh is previously initialized at step 101, the CPU of computer 47 determines a "No" answer at step 117 and causes the program to proceed to step 122 through step 118. At step 122, the CPU of computer 47 calculates an estimated vehicle speed Vs on a basis of the calculated wheel speed Vw and causes the program to proceed to step 123. At step 123, the CPU of computer 47 calculates a reference speed Vsh based on the estimated vehicle speed Vs and causes the program to proceed to step 124 where the CPU of computer 47 calculates a deceleration G of the vehicle in response to an electric signal from deceleration sensor 46. At the following step 125, the CPU of computer 47 executes processing fot fail safe in a usuing manner and returns the program to step 102 shown in FIG. 3.

Assuming that the vehicle has been braked by depression of the brake pedal on the travel road, the CPU of computer 47 determines a "Yes" answer at step 103 and causes the program to proceed to step 105 where the CPU of computer 47 starts to count a lapse of time $t_1$. After processing at step 105, the CPU of computer 47 calculates at step 106 each rotational speed Vw of the road wheels in response to electric signals from the wheel speed sensors 41–44, calculates at step 107 each acceleration DVw of the road wheels based on the calculated wheel speed Vw and calculates at step 108 a rate dDVw/dt of the wheel acceleration based on the calculated wheel acceleration DVw in the same manner as described above. When the program further proceeds to step 109 shown in FIG. 4, the CPU of computer 47 determines whether the ABS flag is set or not. If the answer at step 109 is "Yes", the program proceeds to step 117 shown in FIG. 5. If the answer at step 109 is "No", the program proceeds to step 110 where the CPU of computer 47 determines whether the STEP flag is set or not. If the answer at step 110 is "No", the program proceeds to step 111. If the answer at step 110 is "Yes", the program proceeds to step 112 where the CPU of computer 47 starts to count the STEP time td and causes the program to proceed to step 126 shown in FIG. 5.

Figure 6:
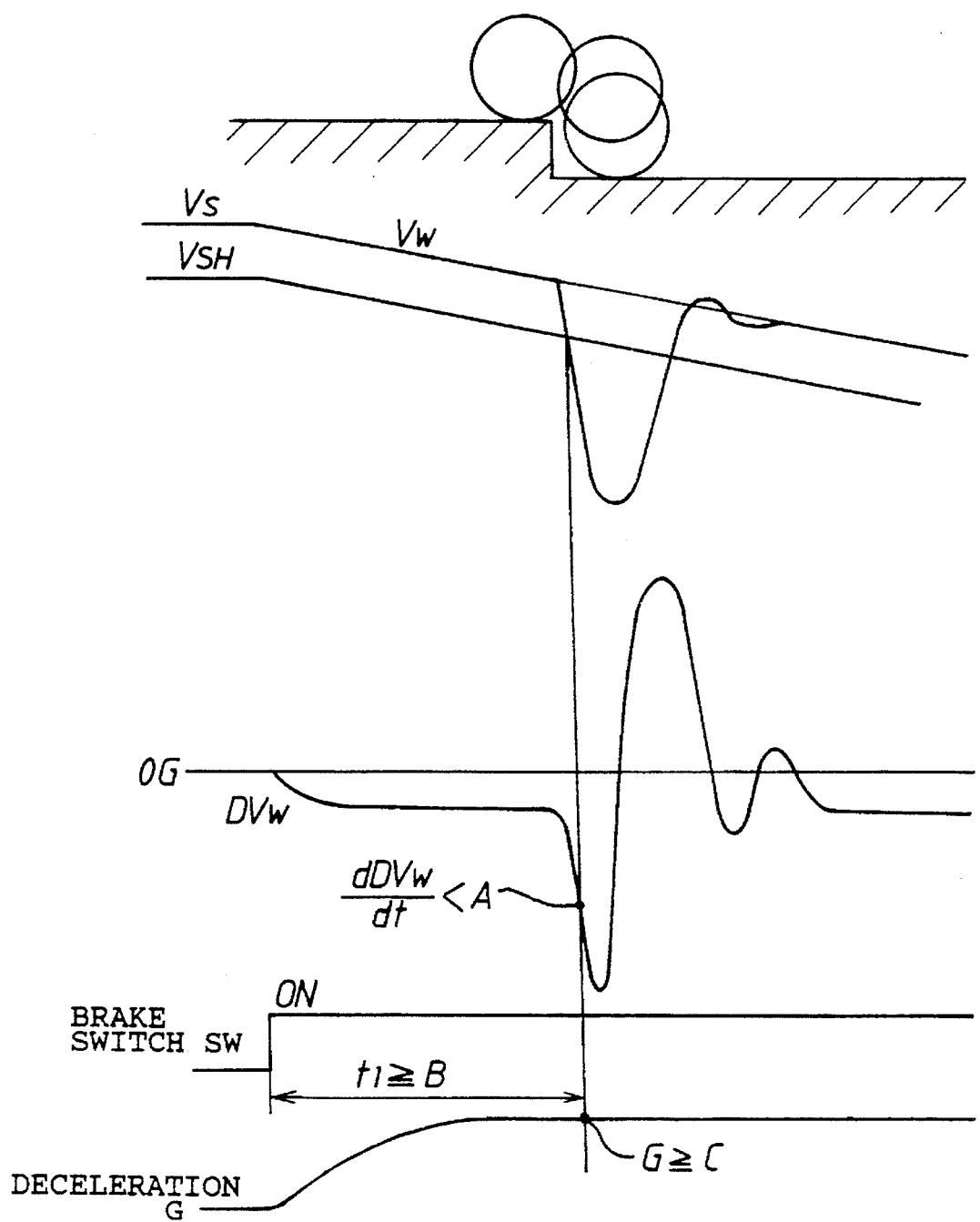
FIG. 6 is a graph showing a braking condition of the vehicle passing over a step on the travel road.

When the program proceeds to step 111 after processing at step 110, the CPU of computer 47 determines whether the reduction ratio dDVw/dt of the wheel acceleration is smaller than the predetermined value A. If the answer at step 111 is "Yes", the program proceeds to step 113 where the CPU of computer 47 determines whether the lapse of time $t_1$ is more than or equal to a predetermined value B. If the answer at step 113 is "Yes", the program proceeds to step 115 where the CPU of computer 47 sets the STEP flag. If the answer at step 113 is "No", the program proceeds to step 114 where the CPU of computer 47 determines whether the deceleration G of the vehicle is more than or equal to a predetermined value C. If the answer at step 114 is "Yes", the program proceeds to step 115 where the CPU of computer 47 sets the STEP flag. In this instance, the STEP flag represents the fact that the road wheels of the vehicle have passed over a step on the travel road in braking operation as shown in FIG. 6. If the answer at step 114 is "No", the program proceeds to step 116 where the CPU of computer 47 resets the STEP time td.

Figure 7:
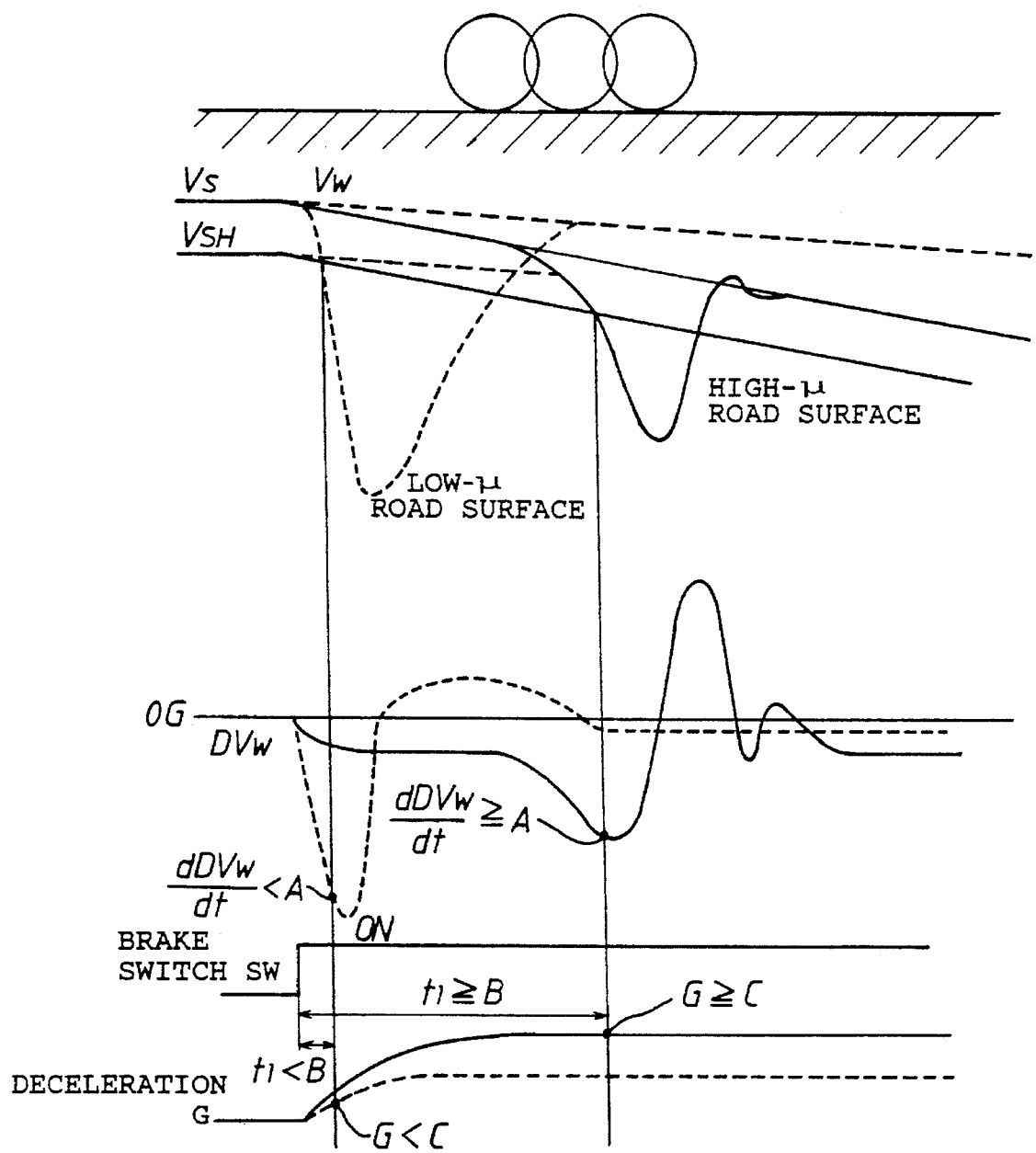
FIG. 7 is a graph showing a braking condition of the vehicle on a flat road.

If there is not any step on the travel road in braking operation of the vehicle on a road surface of high frictional coefficient, the reduction ratio dDVw/dt of the wheel acceleration will be calculated by the CPU of computer 47 as shown by a solid line in FIG. 7. In such an instance, the CPU of computer 47 determines a "No" answer at step 111 and causes the program to proceed to step 116. If there is not any step on the travel road in braking operation of the vehicle on a road surface of low frictional coefficient, the reduction ratio dDVw/dt of the wheel acceleration will be calculated by the CPU of computer 47 as shown by a dotted line in FIG. 7. In such an instance, the CPU of computer 47 determines a "Yes" answer at step 111 and causes the program to proceed to step 113. Since in this instance the lapse of time $t_1$ and the deceleration G of the vehicle are respectively less than the predetermined values B and C. the CPU of computer 47 determines a No" answer respectively at step 113 and 114 and causes the program to proceed to step 116.

When the program proceeds to step 117 after processing at step 116, the CPU of computer 47 determines whether the rotational speed Vw of the road wheels is less than the reference speed Vsh previously calculated by processing at step 123. If the answer at step 117 is "No", the program proceeds to step 122 through step 118. If the answer at step 117 is "Yes", the program proceeds to step 119 where the CPU of computer 47 determines whether the wheel acceleration DVw is less than or equal to a predetermined value D. If the answer at step 119 is "No", the program proceeds to step 118 where the CPU of computer 47 resets the ABS flag. If the answer at step 119 is "Yes", the program proceeds to step 120 where the CPU of computer 47 sets the ABS flag and causes the program to proceed to step 121 for execution of an anti-skid control routine. During execution of the anti-skid control routine at step 121, the CPU of computer 47 produces control signals for control of the switchover valves 33a–36a, 33b–36b and electric motor 37. Thus, the switchover valves 33a–36a, 33b–36b and electric motor 37 are energized or deenergized in response to the control signals applied thereto so that the hydraulic pressure in wheel brake cylinders 21–24 is decreased or increased to prevent the road wheels from locking in braking operation.

When the program proceeds to step 122 after processing at step 121, the CPU of computer 47 calculates an estimated vehicle speed Vs, a reference speed Vsh and a deceleration G of the vehicle respectively at step 122, 123 and 124 in the same manner as described above. At the following step 125, the CPU of computer 47 executes processing for fail safe in a usual manner and returns the program to step 102 shown in FIG. 3.

Figure 4:
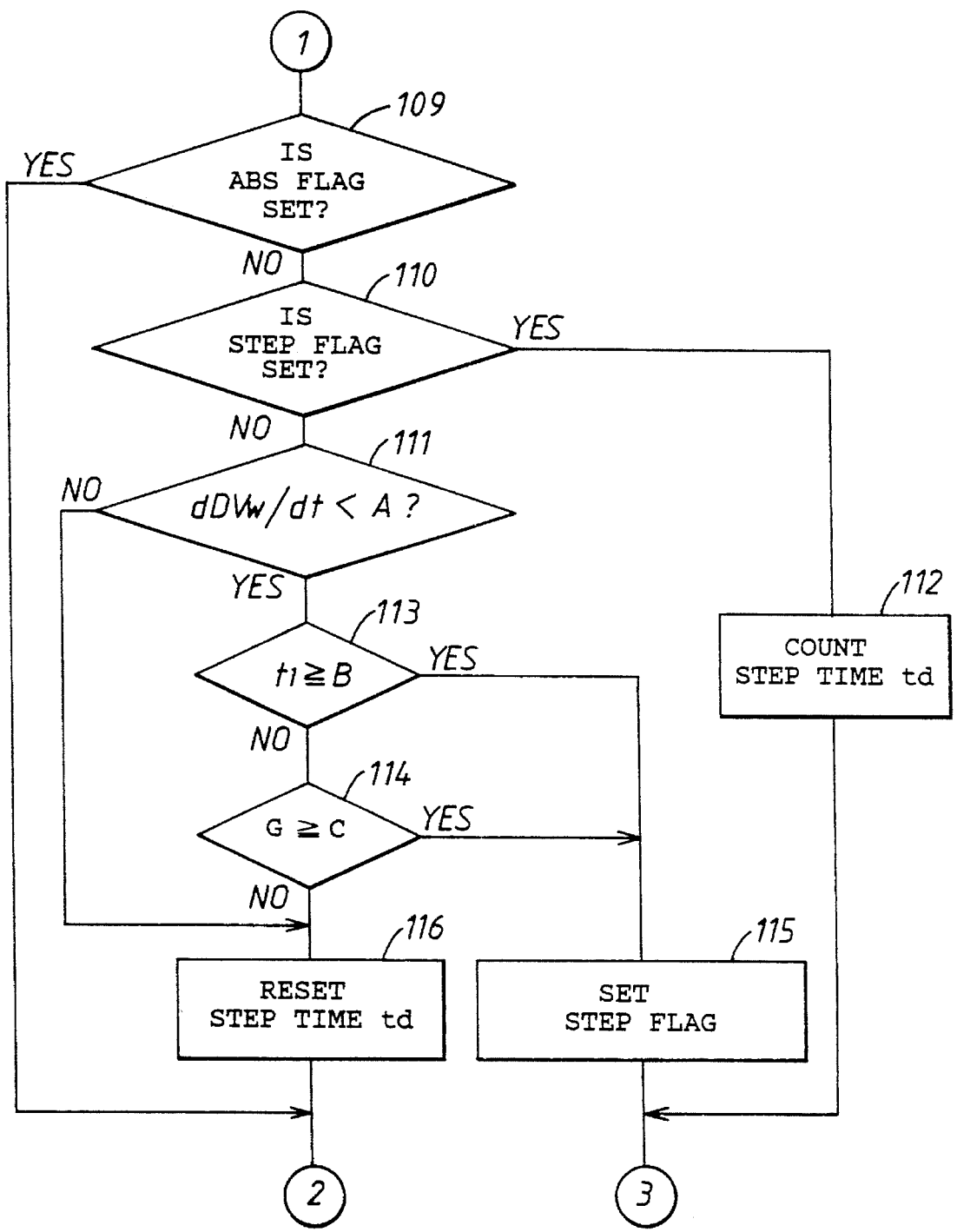
Figure 5:
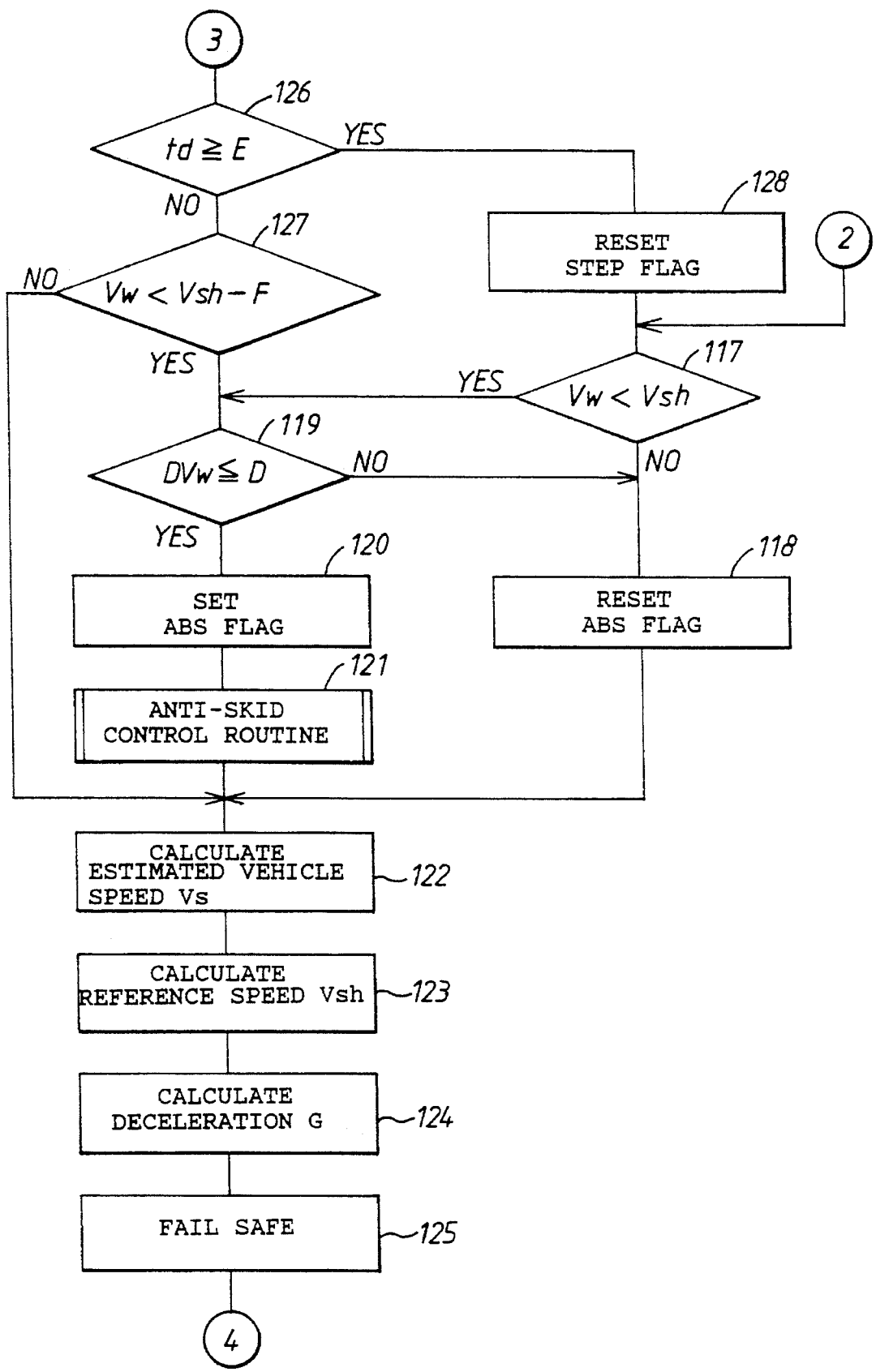

When the program proceeds to step 126 after processing at step 115 shown in FIG. 4, the CPU of computer 47 determines whether the count value of the STEP time td is more than or equal to a predetermined value E (for example, 100 msec). If the answer at step 126 is "Yes", the program proceeds to step 128 where the CPU of computer 47 resets the STEP flag and causes the program to proceed to step 117. If the answer at step 126 is "No", the program proceeds to step 127 where the CPU of computer 47 determines whether the rotational speed Vw of the road wheels is smaller than a value of Vsh–F. If the answer at step 127 is "No", the program proceeds to step 122. If the answer at step 127 is "Yes", the program proceeds to step 119 where the CPU of computer 47 determines whether the wheel acceleration DVw is less than or equal to the predetermined value D.

From the above description, it will be understood that only when the vehicle has passed over a step on the travel road of high frictional coefficient in braking operation, the STEP flag is set at step 115 and maintained for a predetermined time defined by the value of E during which the CPU of computer 47 determines whether the rotational speed Vw of the road wheels is smaller than the value of Vsh–F. With such an adjustment of the reference speed Vsh by subtraction of the value of F, the execution of the anti-skid control routine at step 121 can be avoided to maintain the actuator 30 in its deactivated condition. As a result, the vehicle is applied with sufficient braking force when grounded after passing over the step on the travel road.

Although in the above embodiment presence of a step on the travel road in braking operation has been detected by processing at step 111, 113 and 114, a photo sensor, an ultrasonic sensor or the like may be adapted to directly detect a step on the travel road of the vehicle in braking operation.

What is claimed is:

1. An anti-skid apparatus for installation in a braking system of an automotive vehicle, comprising:

speed detecting means arranged to detect each rotational speed of road wheels of the vehicle for producing electric signals respectively indicative of the detected wheel speed;

an electrically operated actuator arranged to control hydraulic brake pressure applied to each wheel brake cylinder of the road wheels; and an electronic control device for applying an electric control signal to said actuator in response to the electric signals from said speed detecting means so that said actuator is operated to decrease or increase the brake pressure when the rotational speed of the road wheels in braking operation becomes lower than a reference speed the value of which is defined on a basis of a travel speed of the vehicle;

wherein said electronic control device comprises means for detecting a step on a travel road of the vehicle in braking operation, means for comparing the rotational speed of the road wheels with a difference between the reference speed and a first predetermined value when the step on the travel road has been detected within a predetermined time and for maintaining said actuator in its inoperative condition when the rotational speed of the road wheels is larger than the difference between the reference speed and the first predetermined value, and means for applying said electric control Siql to sad actuator only when the rotational speed of the road wheels is smaller than the difference between the reference Speed and the first predetermined value.

2. An anti-skid apparatus as claimed in claim 1, wherein said electronic control device further comprises means for calculating each acceleration of the road wheels in response to the electric signals from said speed detecting means, means for calculating a reduction ratio of the wheel acceleration and means for detecting a deceleration of the vehicle, and wherein said means for detecting a step on a travel road of the vehicle comprises means for comparing the calculated reduction ration of the wheel acceleration with a second predetermined value and means for comparing the detected deceleration of the vehicle with a third predetermined value when the calculated reduction ratio of the wheel acceleration is smaller than the second predetermined value and means for setting a step flag when the detected deceleration of the vehicle is larger than or equal to the third predetermined value.

* * * * *